United States Patent
Pison et al.

(10) Patent No.: US 9,749,818 B2
(45) Date of Patent: Aug. 29, 2017

(54) METHOD FOR ASYNCHRONOUSLY ALLOCATING A BANDWIDTH, AND AN ELECTRONIC COMMUNICATION DEVICE IMPLEMENTING THIS METHOD

(71) Applicant: Cassidian SAS, Elancourt (FR)

(72) Inventors: Laurent Pison, Jouars Ponchartrain (FR); Christophe Gruet, Montigny le Bretonneux (FR); Maxime Delorme, Savigny-le-Temple (FR)

(73) Assignee: CASSIDIAN SAS, Elancourt (FR)

( * ) Notice: Subject to any disclaimer, the term of this patent is extended or adjusted under 35 U.S.C. 154(b) by 2 days.

(21) Appl. No.: 14/365,179

(22) PCT Filed: Dec. 3, 2012

(86) PCT No.: PCT/EP2012/074272
§ 371 (c)(1),
(2) Date: Jun. 13, 2014

(87) PCT Pub. No.: WO2013/087442
PCT Pub. Date: Jun. 20, 2013

(65) Prior Publication Data
US 2014/0341147 A1    Nov. 20, 2014

(30) Foreign Application Priority Data

Dec. 13, 2011   (FR) ...................... 11 61563

(51) Int. Cl.
*H04W 80/04*    (2009.01)
*H04W 88/06*    (2009.01)
(Continued)

(52) U.S. Cl.
CPC ............. *H04W 4/08* (2013.01); *H04W 72/04* (2013.01); *H04W 72/0453* (2013.01); *H04W 74/00* (2013.01)

(58) Field of Classification Search
CPC ..... H04W 80/04; H04W 88/06; H04W 28/04; H04W 72/04
(Continued)

(56) References Cited

U.S. PATENT DOCUMENTS 4,593,282 A * 6/1986 Acampora ............. H04L 12/64
370/447
6,996,630 B1 * 2/2006 Masaki ............... H04L 12/5695
709/239

(Continued)

FOREIGN PATENT DOCUMENTS

EP          1988724 A1    11/2008
GB    EP 242054      *  3/1987  ............. G06F 13/36
(Continued)

OTHER PUBLICATIONS

International Search Report for PCT/EP2012/074272 mailed Jan. 16, 2013 (3 pages).

*Primary Examiner* — Ronald B Abelson
(74) *Attorney, Agent, or Firm* — Gardere Wynne Sewell LLP; Andre M. Szuwalski (57) ABSTRACT

Radio resources are dynamically allocated in a shared band communication system operating in direct mode (DMO). The communication system includes terminals organized in groups. Each group is allocated a resource from a number of resources available within the communication system. This process includes allocating to the group at least one other further resource from the number of resources until an attempted access to the further resource from the group to which the further resource had been allocated has been detected.

8 Claims, 4 Drawing Sheets

(51) Int. Cl.
*H04W 28/04* (2009.01)
*H04W 72/04* (2009.01)
*H04W 4/08* (2009.01)
*H04W 74/00* (2009.01)

(58) Field of Classification Search
USPC .................................................. 370/328, 329
See application file for complete search history.

(56) References Cited

U.S. PATENT DOCUMENTS

| | | | |
|---|---|---|---|
| 2006/0077952 A1* | 4/2006 | Kubsch ................ | H04L 67/104 370/351 |
| 2007/0140115 A1* | 6/2007 | Bienas ................ | H04W 74/008 370/230 |
| 2008/0144493 A1 | 6/2008 | Yeh | |
| 2009/0003289 A1* | 1/2009 | Sugaya ........................ | 370/336 |
| 2010/0061325 A1* | 3/2010 | Moritomo ............. | H04W 72/02 370/329 |
| 2010/0274840 A1* | 10/2010 | Ku ............................ | G06F 9/52 709/203 |
| 2011/0255521 A1* | 10/2011 | Bohn ................ | H04W 74/0808 370/337 |
| 2011/0306349 A1* | 12/2011 | Hakola ................. | H04W 28/04 455/450 |
| 2012/0044815 A1* | 2/2012 | Geirhofer ............. | H04W 8/005 370/248 |
| 2012/0093098 A1* | 4/2012 | Charbit ................ | H04W 72/04 370/329 |
| 2013/0142129 A1* | 6/2013 | Rinne et al. ................... | 370/329 |

FOREIGN PATENT DOCUMENTS

| | | | | |
|---|---|---|---|---|
| IL | GB 2319436 | * | 12/1996 | ............... H04Q 7/28 |
| WO | WO-2010082084 A1 | | 7/2010 | |

* cited by examiner

| R0 | S | F | D | D | D | D | D | D | Cont1 | Cont2 |
| R1 | S | F | D | D | D | D | D | D | Cont1 | Cont2 |
| R2 | S | F | D | D | D | D | D | D | Cont1 | Cont2 |
| R3 | S | F | D | D | D | D | D | D | Cont1 | Cont2 |

| Group1 | | | | | | | | Group2 | | | | | | | | Group3 | | | | | | | | Group4 | | | | | | | |
|---|---|---|---|---|---|---|---|---|---|---|---|---|---|---|---|---|---|---|---|---|---|---|---|---|---|---|---|---|---|---|---|
| S | F | D | D | D | D | D | D | Cont1 | Cont2 | S | F | D | D | D | D | D | D | Cont1 | Cont2 | S | F | D | D | D | D | D | D | Cont1 | Cont2 | S | F | D | D | D | D | D | D | Cont1 | Cont2 |

FIG. 6

| Group1 | | | | | | | | Group2 | | | | | | | | Group1 | | | | | | | | Group4 | | | | | | | |
|---|---|---|---|---|---|---|---|---|---|---|---|---|---|---|---|---|---|---|---|---|---|---|---|---|---|---|---|---|---|---|---|
| S | F | D | D | D | D | D | D | Cont1 | Cont2 | S | F | D | D | D | D | D | D | Cont1 | Cont2 | S | F | D | D | D | D | D | D | Cont1 | Cont2 | S | F | D | D | D | D | D | D | Cont1 | Cont2 |

FIG. 7

| Channel0 2*42Kbps | Group1 | Group2 | Group1 | Group2 | Group1 | Group2 | Group1 | Group2 | Group1 | Group2 |
|---|---|---|---|---|---|---|---|---|---|---|
| Channel1 4*24Kbps | Group10 | Group11 | Group12 | Group13 | Group10 | Group11 | Group12 | Group13 | Group10 | Group11 |
| Channel1 2*42Kbps | Group20 | Group21 | Group20 | Group21 | Group20 | Group21 | Group20 | Group21 | Group20 | Group21 |

FIG. 8

| Channel0 2*42Kbps | Group1 | Group1 | Group1 | Group2 (Void) | Group1 | Group1 | Group1 | Group2 (Void) | Group1 | Group2 (Void) |
|---|---|---|---|---|---|---|---|---|---|---|
| Channel1 4*24Kbps | Group10 | Group10 | Group10 | Group10 | Group10 | Group10 | Group10 | Group10 | Group10 | Group10 |
| Channel1 2*42Kbps | Group20 | Group10 | Group20 | Group10 | Group20 | Group10 | Group20 | Group10 | Group20 | Group10 |

# METHOD FOR ASYNCHRONOUSLY ALLOCATING A BANDWIDTH, AND AN ELECTRONIC COMMUNICATION DEVICE IMPLEMENTING THIS METHOD

The background of the invention is that of telecommunication protocols used in direct mode.

TECHNICAL FIELD

The direct mode allows direct communication between radios without making use of the radio network. The range is however restricted to a few hundreds of meters. The direct mode allows to communicate in areas outside the radio coverage (some underground parkings for example).

Potential users of shared resource radio communication systems are closed user groups such as transport services (taxis, CFF (Suiss Federal Railways), transport companies, etc.), airports, energy companies as well as security organizations (for example police, fire duty, sanitary services, army, civil defense, border guards, etc.). These user groups have their own private shared resource radio communication system, or else they use services of a shared resource radio communication operator.

Shared resource radio communication systems differ from public mobile telephony systems such as GSM or UMTS mainly in quick call setup, group calls, priority calls, end-to-end encryption and the possibility to directly connect two mobile stations without going through a base station (direct mode).

This direct mode is necessary in public mission schedules using a broadband network.

Synchronized Mode with Broadband Base Station

Broadband (BB) communication protocols are known implementing 4G technologies based on an OFDMA (Orthogonal Frequency Division Multiple Access) coding using a base station to synchronize terminals of a network.

Thus, these broadband protocols do not enable terminals to work in direct mode.

Narrowband Asynchronous DMO

Besides, narrowband (NB) communication protocols are known enabling terminals to communicate in direct mode (Direct Mode of Operation—DMO).

Under these protocols, an asynchronous communication protocol is directly implemented between terminals. This is for example the case of TetraPol, Tetra and P25 protocols. The professional radio communications under Tetra (Terrestrial Trunked Radio) standard, being a European standard finalized in 1995 by ETSI (European Telecommunications Standards Institute) have been developed in around sixty countries. These shared resource voice and data radio systems are intended for security teams (police, firemen, ambulances), those of fleet management, plant personnel, or any other closed user group.

Accordingly, there is no use of a base station or repeater.

Under these protocols, each channel belongs to a group of terminals. Each channel is independent, at least from the point of view of synchronization, with respect to others. Thus, there is only synchronization between terminals of a same channel.

Besides, the operating frequencies of each channel are determined in advance. Only the start times of frames and frame scheduling are synchronous and managed at each group.

Specific Narrowband Frequencies Dedicated to DMO

There can be a contention channel in narrowband or broadband communication protocols. This contention channel can be of the RACH (Random Access Channel) type. This is for example the case of GSM, 3G or WiMax protocols. This can also be a Wi-Fi or Ethernet type channel wherein a transmission collision model is implemented.

When such a channel is implemented, any user can use the resource at any time, which implies to implement a collision monitoring and detection protocol. In the case of a collision, the message is repeated on the channel at the end of a random time. The monitoring of collisions thus requires arbitration.

Thus, when there are no specific frequencies dedicated to DMO, the direct mode is not possible in a broadband network and gives rise to a high loss in radio resource in narrowband networks.

However, when such specific frequencies dedicated to DMO exist, the direct mode is possible but thus requires a loss of radio resources (those dedicated to DMO) and management, monitoring and detection of collisions and thus a lower effective rate.

One purpose of the invention is to provide a method for asynchronously allocating a bandwidth enabling the direct mode to be used in a broadband network.

Another purpose of the invention is to provide a method for asynchronously allocating a bandwidth enabling a spectral band to be shared between several terminals.

Another purpose of the invention is to provide a method for asynchronously allocating a bandwidth enabling terminals to use a variable capacity as required.

Another purpose of the invention is to provide an increase in bandwidth for terminals when this increase does not disturb other terminals.

DISCLOSURE OF THE INVENTION

At least one of the abovementioned purposes is achieved with a method for dynamically allocating radio resources in a shared band communication system operating in direct mode, this communication system comprising a plurality of terminals organized in groups, this method comprising allocating to each group a resource from a plurality of resources available within said communication system, characterised in that it further comprises allocating to said group at least one other further resource from said plurality of resources until an attempted access to said further resource from the group to which said further resource had been allocated has been detected.

Thus, the method according to the invention enables a terminal to use a greater radio resource than that reserved thereto and to use the direct mode (DMO) however without implementing a base station.

Thus, the method according to the invention enables a bandwidth asynchronous allocation to be performed in direct mode. The method does not require to use a base station.

This method can be applied in a broadband network. It can also be applied to a narrowband network.

By providing at least one other resource to a group, the method enables the group to use a variable capacity.

Besides, the method according to the invention enables more resources to be allocated to a given group than to another.

Finally, the method according to the invention enables an increase in bandwidth for groups when this increase does not disturb other groups.

Furthermore, the method can further comprise transmitting, by a terminal within one group, a frame comprising:

a first contention word (Cont1) provided to inform other terminals of said group, that said terminal has priority over a given resource, and a second contention word (Cont2) provided to inform one or more terminals using a resource allocated to the group said terminal of which is a member, that said terminal is disturbed by the use of said allocated resource by said informed terminal(s).

Advantageously, the method can further comprise, in response to receiving a second contention word (Cont2) by a terminal using an allocated resource, releasing said resource allocated by said terminal.

Furthermore, the detection of an attempted access to a further resource by a terminal of the group to which said further resource had been allocated, can comprise a step of notifying by a terminal of said group to which said further resource had been allocated.

In a particular version, the plurality of resources can be obtained by separating the shared band according to a frequency access. For example, several FDMA (Frequency Division Multiple Access) type protocols can be used.

In a particular version, the plurality of resources can be obtained by separating the shared band according to a time access. Then, several TDMA (Time Division Multiple Access) type protocols can be used.

In a particular version, the plurality of resources is obtained by separating the shared band according to a time and frequency access. Then, several protocols performing a combination of TDMA type protocols and FDMA type protocols can be used.

According to another embodiment of the invention, it is provided an electronic communication device implemented in a shared band communication system operating in direct mode, this system comprising a plurality of terminals belonging to groups of terminals provided with wireless communication means, to each of said groups being allocated a resource from a plurality of resources available within said communication system, this device being implemented in one of said terminals and comprising data processing means, characterised in that the data processing means cooperate with the wireless communication means to allocate to said terminal at least one other further resource from said plurality of resources until an attempted access to said further resource from the group to which said further resource had been allocated has been detected.

The wireless communication means can comprise one or more antennas. The data processing means can be a processing unit or even programmed circuits, such as FPGA. Thus, the device according to the invention can be a device that is inserted in an already existing terminal such as a customized board. Besides, the device can also be a full terminal, further including an antenna, a microphone and a loud-speaker, etc.

Furthermore, the data processing means and wireless communication means of the terminal can cooperate to transmit a frame comprising:

a first contention word (Cont1) provided to inform other terminals of said group, that said terminal has priority over a given resource, and a second contention word (Cont2) provided to inform one or more terminals using a resource allocated to the group said terminal of which is a member, that said terminal is disturbed by the use of said allocated resource by said informed terminal(s).

Advantageously, the data processing means and wireless communication means can cooperate to release, in response to receiving a second contention word (Cont2) by a terminal using an allocated resource, said resource allocated by said terminal.

In a preferred embodiment, the electronic communication device is configured to receive and process, when it uses a further resource allocated to the group to which the terminal integrating said device belongs, a notification transmitted by a terminal belonging to a group to which said further resource had been initially allocated.

In a particular version, the data processing means are configured to obtain the plurality of resources by separating the shared band according to a frequency access.

In a particular version, the data processing means are configured to obtain the plurality of resources by separating the shared band according to a time access.

In a particular version, the data processing means are configured to obtain the plurality of resources by separating the shared band according to a time and frequency access.

Definitions:

DMO: "Direct Mode Operation". This is an asynchronous operating mode between terminals not requiring an infrastructure, that is not requiring a base station or repeater.

A radio resource is the frequency base entity assigned to a mission:
- in the case of narrowband networks, this is an assignment of base frequencies to support voice and minimum signalling,
- in the case of LTE (Long Term Evolution) networks, this resource is a frequency allocation which can be the size of a resource block (RB).

A mission or group is a group of users sharing a common resource as a single group of users. Generally, a mission is daily assigned a resource.

A host/local/group mission on a channel is the mission to which the channel has been statically allocated.

A guest mission or guest group on a channel is a mission to which the channel has not been statically allocated. The channel is temporarily used because of the absence of the host mission on the geographical area or has obtained the permission to use the channel from the host mission.

By critical mission, it is meant a mission for which resources (radio, but also CPU, memory, . . . ) should necessarily be accessible "at any time". The channel is considered as a "critical mission" for its host mission, and the system should ensure that at any time (that is whatever the topology and geography of missions), the channel can be assigned (or reassigned if pre-empted by any other "visiting" of the mission) for its host mission.

The overlap is a generic notion of a resource statically allocated to another group: a group G0 uses the resource R0 and overlaps the resource R1 which is statically allocated to the group G1.

DESCRIPTIONS OF THE FIGURES

Other advantages and features of the invention will appear upon reading the detailed description of implementations and embodiments in no way limiting, of exemplary values and the following appended drawings.

Figure 1:
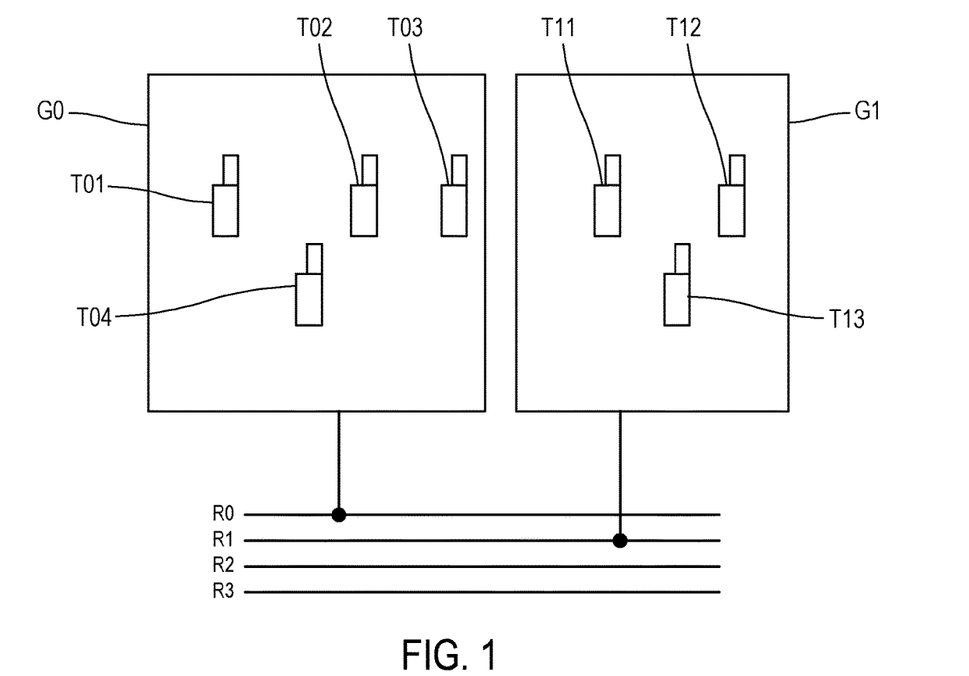
FIG. 1 is a view of a bandwidth allocation method according to prior art.

In reference to FIG. 1, a first group G0 of terminals T01, T02, T03, T04, and a second group G1 of terminals T11, T12, T13 are respectively connected to resources R0, R1 from a plurality of resources R0-R3. All these terminals use a DMO type protocol.

Resources R2 and R3 are not assigned to any group of terminals.

When a terminal desires to transmit data, for example T01, it first listens to all the resources (R0, R1, R2, R3, R4). If one or more resources are unoccupied, this terminal emits data on the at least one of these unoccupied resources according to a frame illustrated in FIG. 2.

Figure 2:
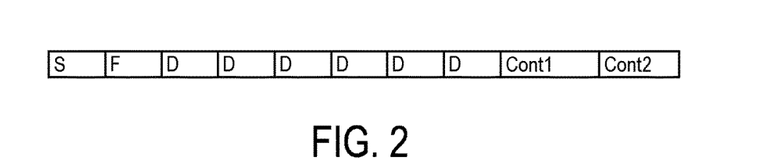
FIG. 2 is a representation of a frame used for implementing a method according to the invention.

The frame comprises:
a synchronization word S;
a format word F;
six data words D;
a first contention word Cont1;
a second contention word Cont2.

The word S is used by the members of a group to be synchronized. The word F announces the format of the frame. The six data words D comprise the payload.

The first contention word Cont1, also called first contention slot, enables the priority to be used within a group. Thus, a member of the group can specify that it has priority using Cont1 slot. When a member of the same group receives such a frame, the same knows that it must release the occupied radio resource or not occupy it.

The second contention word Cont2, also called second contention slot, enables a terminal disturbed by a use of a resource its group of which is owner to inform it to the disturbing terminal(s), also called guest terminal(s). This second word can be used on a specific resource only by a terminal belonging to a group being owner of this specific resource, also called local group.

Since resources R1, R2, R3 are free, terminal T01 transmits data on all these resources. Terminal T01 transmits data on three further resources.

Thus, terminal T01 increases in transmission capacity by occupying resources which are not dedicated thereto, that is resources for which group G0 is not an owner.

When a member of the group—in this description, terminal T11—to which belongs an occupied resource is disturbed by the data transmission by T01, terminal T11 transmits a frame on resource R1 and informs it is disturbed by using the Cont2 slot. Upon receiving this frame, terminal T01 stops using resource R1. Resource R1 is then released by terminal T01. Thus, the detection of an attempted access to further resource R1 by a terminal of group G1 to which further resource R1 has been allocated comprises a step of notifying by terminal T11 of group G1 to which further resource R1 had been allocated.

Figure 3:
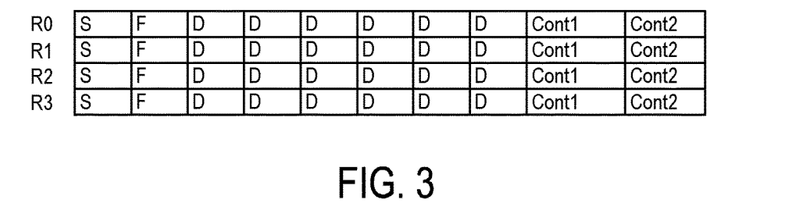
FIG. 3 is a representation of frames used for implementing a method according to the invention.

As illustrated in FIG. 3, frames are synchronized using previously described synchronization word S. A terminal must listen to all the resources it occupies and which are not assigned thereto before continuing to transmit on resources which do not belong thereto.

Figure 4:
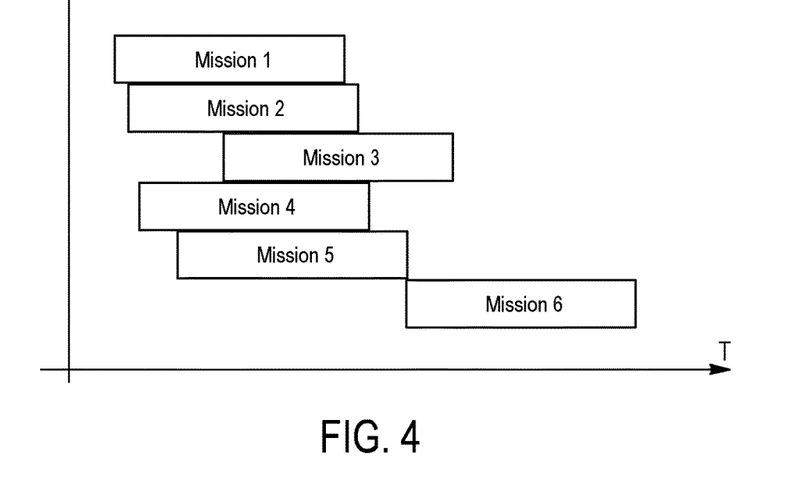
FIG. 4 is a view of a modified LTE protocol according to the invention.
Figure 5:
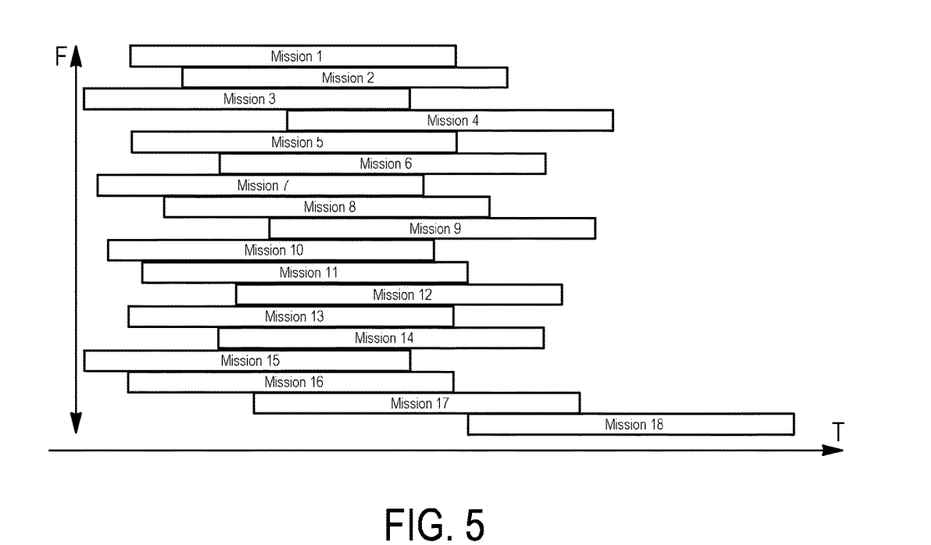
FIG. 5 is a view of a modification of LTE protocol according to the invention.

The principle of a modification of LTE protocol using a method according to the invention will now be illustrated in reference to FIGS. 4 and 5.

Both time T and frequency F axes appear in these figures. Several missions are also shown in these figures.

Missions 1, 2, 3, 4, 5 and 6 are represented in FIG. 4.

The paving of the radio resource is based on principles of TETRA protocol. The paving is thus performed in frequency according to a splitting of a bandwidth of 1.4 MHz into six RB ("Resource Block") each having a band of 180 KHz (180 KHz*6=1.4 MHz). Thus, each mission is assigned a communication channel and the possible rate per mission is 100 Kbits/s using a suitable modulation and coding scheme. The method according to the invention herein enables six co-located missions to be deployed.

In this modification of LTE protocol, a new initial synchronization frame according to the invention is used.

In reference to FIG. 5, it is shown that each of the previously described RB can be subdivided into three sub-RB. The point is to be able to support the 18 groups represented in FIG. 5 by assigning a sub-RB to each group.

The rate of each of the groups is thus substantially equal to 33 Kbits/s.

The new synchronization frame according to the invention is also used. Moreover, the format word F according to the invention is in this case used to describe the modified LTE frame.

Figure 6:
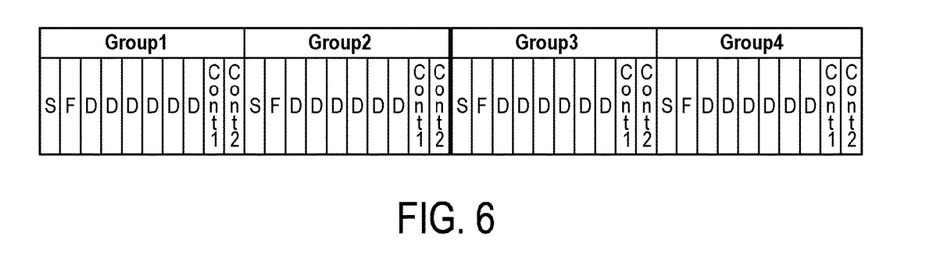
FIG. 6 is a view of an embodiment of the method according to the invention.

In reference to FIG. 6, the use of a method according to the invention is used when a plurality of resources is obtained by separating the shared band according to a time access.

Thus, a same frequency band can be subdivided as illustrated in FIG. 6 by using a division by four of the period of time assigned to each group. By being locating in a rate of 100 Kbps and by separating this time shared resource into four groups represented in the figure, each of these groups then has a rate of 25 Kbps once a time synchronization has been implemented. A rate of 25 Kbps is sufficient to transmit voice type data on a channel.

With the method according to the invention, a terminal belonging to the first group can use the second time resource of the second group. By overlapping this resource, the terminal of this first group can multiply its rate by two.

Figure 7:
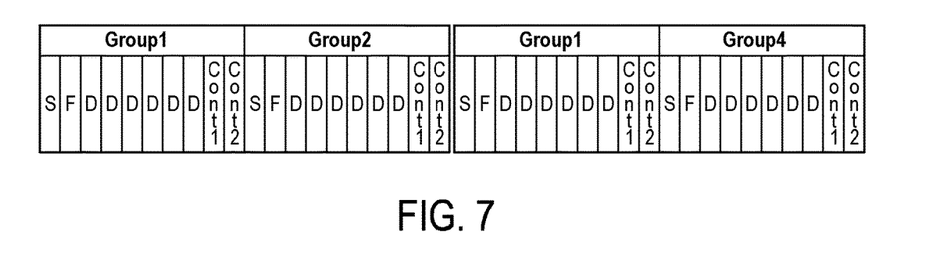
FIG. 7 is a view of another embodiment of the method according to the invention.

This is shown in FIG. 7, in which it can be seen that since the third group is not present, the first group uses the resources which were allocated to the third group. Thus, the first group has its rate multiplied by two. It is also observed that the time overlapping is not continuous in time since the resources of the second group are not used by the first group.

Figure 8:
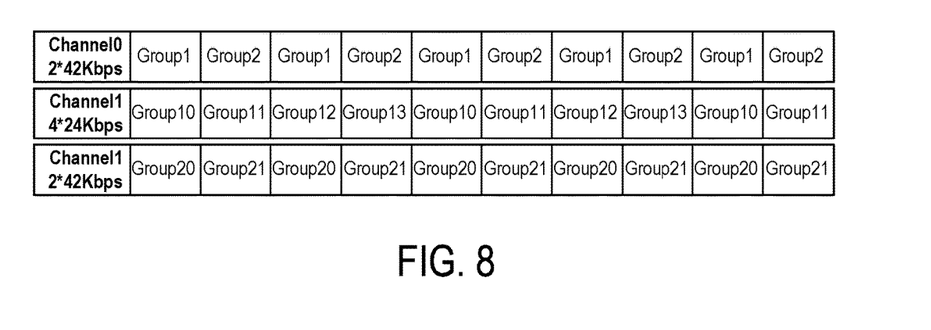
FIG. 8 is a view of another embodiment of a method according to the invention.

In reference to FIG. 8, it is illustrated a space and frequency paving of the use of the radio resource.

The radio resource is divided into three frequency bands.

A first frequency band occupies two channels of 42 Kbps. This frequency band is also divided in time into two groups, the groups 1 and 2 which alternately occupy it over time.

A second frequency band occupies four channels of 24 Kbps. This frequency band is also divided in time into four groups, groups 10, 11, 12 and 13 which alternately occupy it over time.

A third frequency band occupies two channels of 42 Kbps. This frequency band is also divided in time into two groups, groups 20 and 21 which alternately occupy it over time.

With the method according to the invention, group 1 will detect the absence of group 2 and group 10 will be able to detect the absence of groups 11, 12, 13 and 21.

Figure 9:
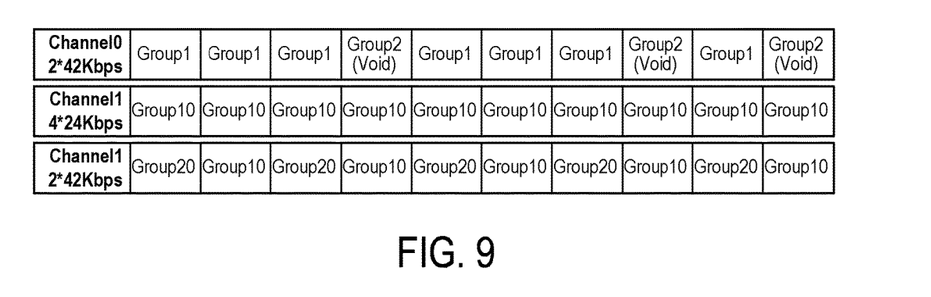
FIG. 9 is a view of another embodiment of a method according to the invention.

A possible result of the use of available resources with the use of an embodiment of the method according to the invention is illustrated in FIG. 9.

Thus, FIG. 9 shows that the first frequency band described in FIG. 8 will be occupied in time according to a sequence Group1, Group1, Group1, void, Group1, Group1, Group1, void, Group1, void.

Thus, it can be seen that the occupation of the time resources is itself likely to change in time.

The second frequency band described in FIG. 8 is wholly occupied by group 10 which has noticed the absence of groups 11, 12 and 13.

Finally, the third frequency band described in FIG. 8 is herein used alternately with groups 10 and 20, group using the frequency band released by the absence of group 21.

According to another embodiment not represented, the method according to the invention can be used to set up a two hop communication between terminals of a same group. The resource assigned to the first terminal is thus dynamically separated for the purpose to be able to be used for direct one hop communication on the one hand, and contain in a separated resource the content of the two hop communication on the other hand.

Figure 10:
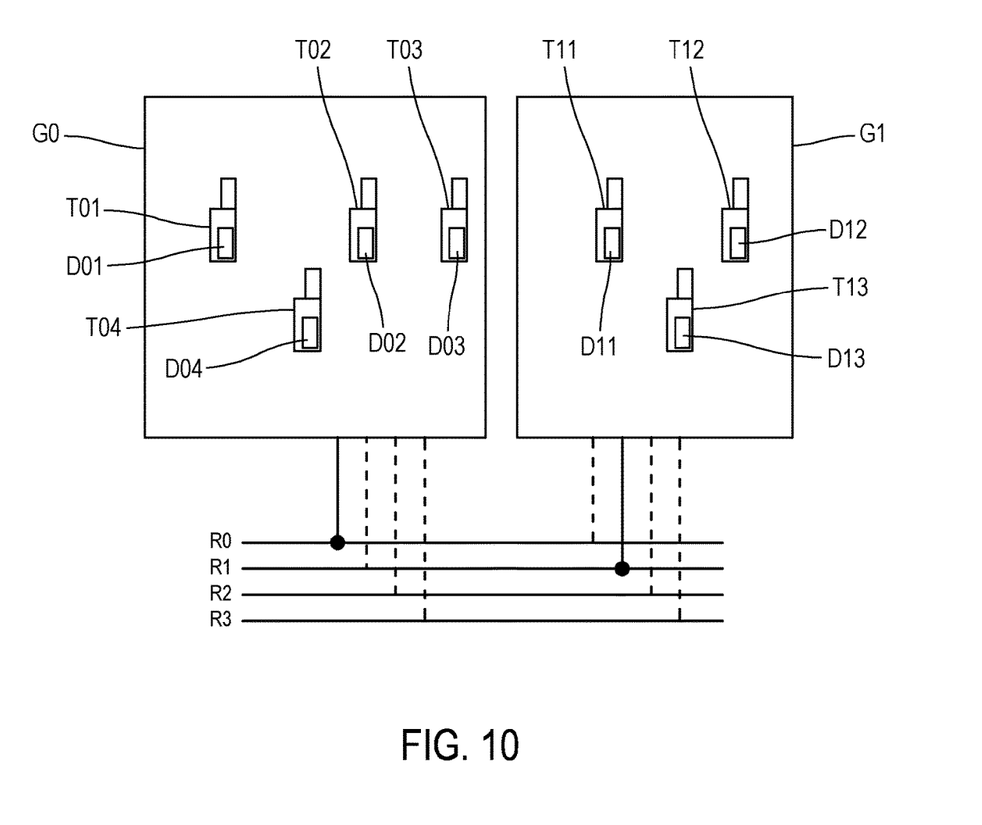
FIG. 10 is a view of an embodiment of a device according to the invention.

FIG. 10 illustrates an embodiment of devices according to the invention.

A shared band communication system operating in direct mode is represented. This system comprises four terminals T01, T02, T03 and T04 belonging to a group of terminals G0 as well as three terminals T11, T12 and T13 belonging to a group of terminals G1. The terminals comprise an antenna providing wireless communication.

A first resource R0 is allocated to group G0 of terminals. A second resource R1 is allocated to group G1 of terminals as is represented in the figure by solid lines. Thus, only two resources are allocated from the four resources available.

Terminals T01, T02, T03, T04, T11, T12 and T13 comprise devices D01, D02, D03, D04, D11, D12 and D13 according to the invention, respectively. These devices are electronic communication modules as an electronic board insertable in the terminals and comprise data processing means.

The processing means of these devices D01, D02, D03, D04, D11, D12 and D13 cooperate with the wireless communication means of terminals T01, T02, T03, T04, T11, T12 and T13 to allocate to the terminals at least one other further resource from the four resources. These allocations are performed according to a method according to the invention. The dotted lines in FIG. 10 illustrate the possibility for allocating these resources to the terminals by the devices. These allocations remain operating until an attempted access to a further resource from the group to which the further resource had been allocated has been detected.

According to another embodiment not represented, a device according to the invention is a module directly integrated to a terminal.

Of course, the invention is not restricted to the examples just described and numerous alterations can be provided to these examples without departing from the scope of the invention.

The invention claimed is:

1. A method for allocating radio resources in a shared band communication system operating in direct mode, wherein the communication system includes a plurality of terminals organized in groups of terminals and communicating using a frame comprising: a first contention word and a second contention word, wherein the method comprises:

statically allocating to each group of terminals a distinct resource from a plurality of resources within said communication system, wherein a first resource statically allocated to a first group of terminals is not simultaneously statically allocated to a second group of terminals, and wherein a second resource statically allocated to the second group of terminals is not simultaneously statically allocated to the first group of terminals, dynamically allocating to the first group of terminals, in addition to the first resource statically allocated to the first group of terminals, the second resource from said plurality of resources that is statically allocated to the second group of terminals;

transmitting, by a terminal within the first group to other terminals within said first group, said frame over the first resource statically allocated to the first group and said frame over the second resource statically allocated to the second group and dynamically allocated to the first group, wherein said frame transmitted over the first resource includes information in the first contention word to inform the other terminals of said first group that said terminal within the first group has priority over the first resource statically allocated to the first group, and with respect to terminals within the second group that may receive the transmission of the frame over the second resource by said terminal within the first group and be disturbed thereby, transmitting over the second resource statically allocated to the second group and dynamically allocated to the first group, by a terminal within the second group, to said terminal within the first group said frame with information in the second contention word to inform said terminal within the first group that said terminal within the second group is disturbed by the dynamic allocation and use of said second resource by said terminal within the first group.

2. The method according to claim 1, further comprising, in response to receiving said frame with information in the second contention word by said terminal in the first group, releasing the dynamic allocation of said second resource.

3. The method according to claim 1, further comprising detecting an attempted access to said second resource by said terminal in the first group by said terminal in the second group by receipt of said frame with information in the first contention word.

4. The method according to claim 1, further comprising obtaining the plurality of resources by separating the shared band according to a frequency access.

5. The method according to claim 1, further comprising obtaining the plurality of resources by separating the shared band according to a time access.

6. The method according to claim 1, further comprising obtaining the plurality of resources by separating the shared band according to a time and frequency access.

7. A method, comprising:

statically allocating to a first group of terminals a first communications resource;

statically allocating to a second group of terminals a second communications resource;

wherein the first communications resource statically allocated to the first group of terminals is not simultaneously statically allocated to the second group of terminals and wherein the second communication resource statically allocated to the second group of terminals is not simultaneously statically allocated to the first group of terminals;

dynamically allocating to the first group of terminals, in addition to the first communications resource statically allocated to the first group of terminals, the second communications resource that is statically allocated to the second group of terminals;

making a communication by a terminal within the first group to the plurality of terminals in the first group over both the first communications resource and the second communications resource, wherein said communication by the terminal within the first group of the first communications resource uses a first frame including information informing other terminals of said first group that said terminal within the first group has priority over the first communications resource statically allocated to the first group;

with respect to terminals of said second group that may receive said communication by said terminal within the first group over said second communications resource and be disturbed thereby, making a communication by a terminal within the second group over said second communications resource using a second frame including information informing said terminal within the first group that said terminal within the second group is disturbed by said communication made by said terminal within the first group; and in response to receipt of said communication by said terminal within the first group, terminating the dynamic allocation to the first group of terminals of the second communications resource that is statically allocated to the second group of terminals.

8. The method of claim 7, wherein said first and second frames each include a first contention word and a second contention word, wherein said information informing said other terminals of said first group that said terminal within the first group has priority over the first communications resource statically allocated to the first group is transmitted in the first contention word, and wherein said information informing said terminal within the first group that said at least one terminal within the second group is disturbed by said communication made by said terminal within the first group is transmitted in the second contention word.

* * * * *